United States Patent [19]

Godbehere

[11] 4,404,022
[45] Sep. 13, 1983

[54] DORE SLAG TREATMENT

[75] Inventor: Peter W. Godbehere, Noranda, Canada

[73] Assignee: Noranda Mines Limited, Toronto, Canada

[21] Appl. No.: 334,897

[22] Filed: Dec. 28, 1981

[51] Int. Cl.³ .................. C22B 11/04; C22B 1/00; C01G 5/00; C01G 7/00
[52] U.S. Cl. .................. 75/2; 75/118 R; 75/83; 209/166; 423/26
[58] Field of Search .............. 75/2, 118 R; 423/26; 209/166

[56] References Cited

U.S. PATENT DOCUMENTS 3,627,486 4/1969 Nakano.
4,029,494 6/1977 Kapanen et al..
4,047,939 9/1977 Morrison.

FOREIGN PATENT DOCUMENTS 864529 4/1961 United Kingdom .................. 75/2

OTHER PUBLICATIONS

RI 7562, "Recovery of Copper From Converter Slags by Flotation", Bureau of Mines Report of Investigations/1971, U.S. Dept. of the Interior.

Primary Examiner—O. R. Vertiz
Assistant Examiner—Chung Pak
Attorney, Agent, or Firm—Fleit, Jacobson & Cohn

[57] ABSTRACT

A method is disclosed for treating doré slag resulting from smelting of a doré furnace charge, by grinding such slag and then subjecting the obtained pulp to froth flotation in the presence of a suitable frother and collector to produce a precious metals concentrate which is then filtered and returned to the doré furnace with the next charge. The tails from the froth flotation may then be finely ground and subjected to several additional flotation stages to improve recovery of the precious metals, and the entire operation is preferably carried out as a closed loop process so that only the tailings from the rougher flotation are removed and shipped to the smelter.

11 Claims, 1 Drawing Figure

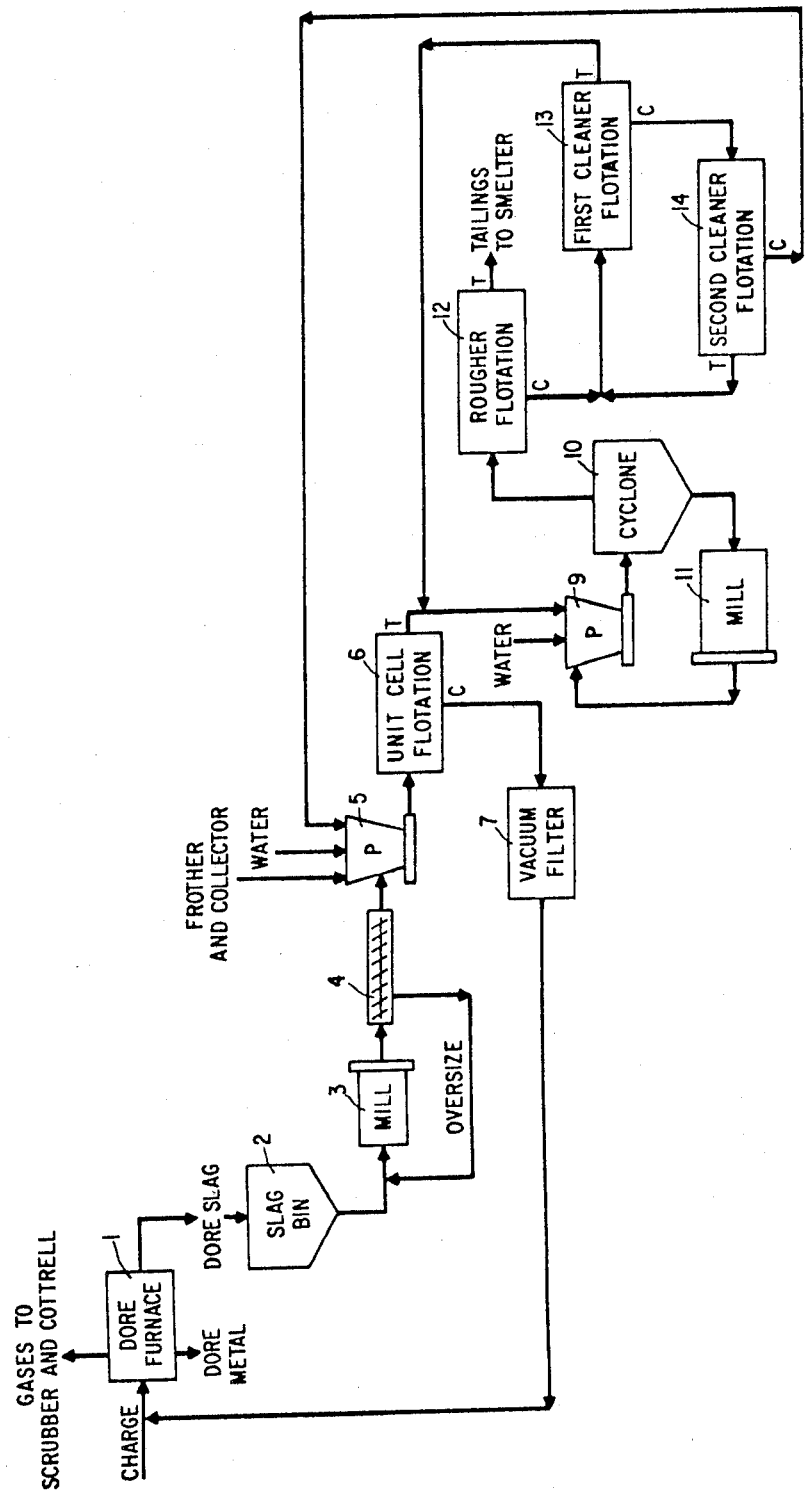

DORÉ SLAG TREATMENT

This invention relates to the treatment of doré slag with a view of improving the overall operation of doré metal production and releasing a substantial quantity of precious metals from the system.

It is well known that slimes from the electrolytic refining of copper are treated to remove therefrom as much copper, selenium and tellurium as possible and the remainder material is then smelted in the doré furnace to produce doré metal consisting essentially of silver and gold.

U.S. Pat. Nos. 3,627,486 and 4,047,939, both belonging to Noranda Mines Limited, are illustrative of slimes treatment processes. As shown in both these patents, the residue from such slimes treatment processes, which is in the form of roasted pellets, is charged to a doré furnace where it is smelted with a suitable flux, such as silica and/or soda ash, at temperatures in the range of 1800° F.–2500° F. ($\sim$980° C.–1370° C.) to eliminate the residual impurities and produce the so-called "doré metal".

The doré furnace is essentially a reverberatory furnace in which the slime charge is smelted, thereby producing a considerable amount of silica and lead slags, also called "doré slag", which slag is skimmed off into pots or ladles, cooled in them until it solidifies and then dumped out and broken down into smaller pieces for easier handling. This doré slag generally contains about 500–2000 oz per ton ($\sim$15,000–60,000 g/tonne) of Ag and about 10–30 oz per ton (300–900 g/tonne) of Au.

Normally, such doré slag is either returned to the anode furnace at the copper refinery or to the copper smelter. Both these practices are unsatisfactory because when the doré slag is returned to the anode furnace, this leads to a large circulating load of lead, antimony and bismuth in the resulting anodes and when, to reject the impurities from the copper refinery the doré slag is returned to the copper smelter, this produces an increased tie-up of precious metals within the overall system as well as increased risk of loss or theft in transit and handling.

It is an object of the present invention to obviate the above disadvantages by providing a novel method for the treatment of doré slag, whereby said slag is subjected to milling and flotation operations.

It is a further object of the present invention to provide a novel system wherein the resulting concentrate from the milling and flotation operations is recycled to the doré furnace to produce a new metallurgical balance which leads to the release from the system of a substantially quantity of precious metals.

Further objects and advantages of the present invention will become apparent from the following detailed description thereof.

The method of this invention is a method of concentrating precious metals in doré slags, which comprises the steps of grinding the slag, mixing the obtained pulp with water to form a slurry, adding a suitable collector to the slurry for selective flotation of precious metals, adding a suitable frother, aerating the slurry to produce a precious metals concentrate in the form of a froth on top of the slurry, and separating said concentrate from the remainder of the slurry. The resulting concentrate is normally recycled to the doré furnace as part of a new charge, thereby producing a new metallurgical balance in said furnace.

In a preferred embodiment, the tails from such flotation are subjected to a secondary grinding and a rougher flotation which may be followed by additional cleaner flotation stages.

The tailings from the rougher flotation containing only about 190 oz/ton ($\sim$5800 g/tonne) Ag and about 0.6 oz/ton ($\sim$19 g/tonne) Au are returned to the smelter resulting in a recovery of about 90% for Ag and about 98% for Au.

In another preferred embodiment, the initial grinding of the slag is carried out as a semi-autogenous grinding operation and leads to a fairly coarse pulp although suitable for flotation in a unit cell with an appropriate frother and collector. Typically, the grinding proceeds until about 80% of the pulp passes a 100 mesh screen. This is done in order that coarse particles of metallic silver and gold, which are present in the slag, can be liberated and be separated from the gangue component of the slag in the unit cell flotation. The secondary grinding, on the other hand, is pursued to produce a fine grind with typically 95% of the pulp passing 325 mesh so that maximum liberation of precious metals is achieved. The concentrate from the cleaner flotation stage is preferably recycled to the unit cell flotation stage. All flotation stages are carried out using a suitable frother and collector for such operations. The frother should produce a stable foam which assists in the collection of the mineralized froth. Many such frothers are known and include pine oil, polyglycols and the like. One of the most commonly used frothers is MIBC or methyl iso-butyl carbinol and it is the preferred frother for the purposes of the present invention. The collector should react with the surfaces of silver and gold and their compounds to produce a hydrophobic skin which assists in recovery of concentrate of these metals with the froth. Again, a number of such collectors are known in the art. They include thiophosphates, thioureas, xanthates and the like. The preferred collector according to the present invention is sodium di-isobutyl dithiophosphate sold by Cyanamid as Aero promoter S-3477.

It should be mentioned that milling and flotation of converter slags to recover copper therefrom is well known in the art. A good study thereof is made in RI 7562 of the Bureau of Mines Report of Investigations/1971, published by the United States Department of the Interior. The converter slags are essentially iron-silica slags (also called Fayalite slags) with a high proportion of magnetite in them, as illustrated by the analysis given on page 2 of the above Report. A very important feature of the treatment of converter slags is the type of initial cooling to which they are subjected. For example, they can be cooled in the air or slow cooled in induction furnaces or water quenched before they are milled and subjected to froth flotation. The copper recovery from the converter slags will largely depend on this initial cooling treatment.

The doré slag treated in accordance with the present invention is, of course, entirely different from converter slags. It essentially consists of silica-lead slags with very little iron in them and with no magnetite. Furthermore, the grinding and flotation of the doré slag according to the present invention, is intended to improve recovery of precious metals rather than of copper, as in the case of converter slags. In fact, the slimes which are charged into the doré furnace are usually decopperized by a prior slimes treatment process, such as disclosed in U.S. Pat. No. 4,047,939. Also, the initial cooling of the doré slag is of no particular importance and the actual cooling practice will largely depend on the available space and equipment rather than be part of a specific treatment, as is the case with converter slags.

The present invention will now be further described with reference to the single FIGURE appended hereto and representing a flow sheet of the method according to a preferred embodiment of this invention.

As shown in the FIGURE, where the letter C stands for concentrate, T for tails and P for pump, the doré furnace 1 is provided with a suitable charge which is smelted therein to produce doré metal and doré slag. The gases from the furnace are directed to a scrubber and a Cottrell precipitator, as is well known in the art. The doré metal goes to the parting plant to separate silver from gold. The doré slag, which consists of silica and lead slags formed during the smelting operations in the doré furnace, is skimmed into pots or ladles and allowed to solidify, then dumped out and broken down into small chunks or pieces, which are charged into slag bin 2.

From slag bin 2, the slag is fed to mill 3 where it is ground to desired fineness, preferably by a semi-autogenous grinding operation. The resulting pulp passes via a screw classifier 4, from which the oversize is returned to mill 3, and is mixed with water and a suitable frother and collector using pump 5, and pumped to the unit cell flotation stage 6 which consists of a number of flotation cells connected with each other as is known in the art. The concentrate from the unit cell flotation 6, namely the frother produced therein, is filtered in vacuum filter 7, and returned to the doré furnace 1 with the next charge. The tails from the unit cell flotation 6 are pumped by pump 9 to a cyclone 10 where the coarse portion is separated from the fine and subjected to milling in mill 11 to desired fineness and then returned to pump 9. The fine portion from cyclone 10 goes to rougher flotation 12 and the concentrate from the rougher flotation 12 is subjected to a first cleaner flotation 13 from which the tails are returned to pump 9 and the concentrate goes to a second cleaner flotation 14. The concentrate from this second cleaner flotation 14 goes back to pump 5 and the tails are recycled to the first cleaner flotation 13.

It should be noted that, according to the preferred embodiment illustrated in the FIGURE, an essentially closed loop operation is obtained so that the only material removed from the system consists of tailings from the rougher flotation which are normally sent to the copper smelter. Everything else is recycled to the system and even most of the water going to pumps 5 and 9 is recycled process water.

The invention will now be described with reference to the following non limitative example:

EXAMPLE 30,000 lbs (~13,600 kg) of roasted pellets (from the slimes treatment process described in U.S. Pat. No. 4,047,939), mixed with about 500 lbs (~230 kg) of soda ash, are charged into the doré furnace and melted therein. The slag formed upon melting is skimmed off into pots containing 300–400 lbs/pot (~135–180 kg/pot). Then, the remaining charge is blown with air using an air lance for about two hours and the resulting slag is also skimmed into pots. Both these slags, called silica slag and lead slag respectively, are permitted to solidify in said pots and then dumped and broken into small pieces or chunks (on an average about 10–15 cm in diameter), which are charged into the slag bin. The quantity of the second lead slags about 1/10 of the quantity of the silica slag and both slags constitute the so-called doré slag which is treated according to the present invention. A typical analysis of this doré slag at the Noranda Mines Limited CCR refinery in Montreal East, is as follows:

Ag—1550 oz per ton (~48,425 g/tonne)
Au—22 oz per ton (~686 g/tonne)
$SiO_2$—23%
Pb—22%
Na—3.5%
Fe—3.4%
Sb—2.0%
Bi—1.2%
As—0.4%
Sn—0.3%
Ni—0.1%
Cu—1.2%
Se—0.6%
Te—0.3%.

The remainder being sulphates and other residues.

About 90 tons (~80 tonnes) of such slag per month are obtained and are treated in a milling and flotation circuit described above with reference to the appended FIGURE. Thus, slag from bin 2 is milled in Cascade mill 3 in a semi-autogenous manner (the mill contains only about 0.5% to 2.0% charge of steel balls) to produce pulp 80% of which passes 100 mesh. This pulp is conveyed via screw classifier 4 and pump 5 to the unit cell flotation stage consisting of four cells. MIBC is added as frother and S3477 as collector. Both reagents are added to the pump 5 at the rate of 0.5 lb per ton of slag (~0.25 kg/tonne). Although this rate has been found suitable in the present case, it can obviously change depending on many factors, such as the slag composition, the fineness of the grind, etc. The reagents may also be introduced to the various flotation stages rather than only to pump 5; however, it has been found that it is easier to control the flotation operations by introducing the reagents at one place only.

The rougher flotation stage 12 consists of eight cells and the tailings from this flotation go to a thickener and eventually are sent to the smelter to be fed to a copper smelting furnace. A typical analysis of these tailings is as follows:

Ag—186 oz per ton (~5800 g/tonne)
Au—0.6 oz per ton (~19 g/tonne)
Cu—1.0%
As—0.4%
Sb—1.9%
Pb—19.0%
Bi—1.0%
Se—0.1%
Te—0.2%
Ni—0.06%.

The remainder being silica, sulphates and other residues.

The water from the thickener and the vacuum filter can be reused as process water in the grinding and flotation circuits.

The rougher feed comes from cyclone 10 and consists of a finely ground pulp with 95% passing 325 mesh. This is achieved by grinding the tails from the unit cell flotation in Marcy mill 11 to the desired fineness. The concentrate from the unit cell flotation which contains about 12,000–16,000 oz per ton (~375,000–500,000 g/tonne) of Ag and about 150–250 oz per ton (~4700–7800 /g/tonne) of Au is returned to the doré furnace 1 with the next charge, after filtering and, if desired, drying. Also, after the rougher flotation 12, two cleaner flotations of four cells each have been found satisfactory to achieve adequate overall recovery of the precious metals, which is about 90% for silver and about 98% for gold.

It should also be mentioned that, in the doré furnace itself, after removing the lead slag, further refining operations are performed with addition of soda ash and nitre (NaNO$_3$) respectively, leading to the doré metal. These operations also produce two additional slags, the so-called soda slag and copper slag respectively. The quantity of these slags is much smaller than that of the combined quantity of the silica slag and lead slag (dore slag). These additional slags were not subjected to grinding and flotation in accordance with this invention. They were returned to the anode furnace.

The various operations of the doré furnace and the various slags produced are well known in the art; however, what is not known, nor can be considered obvious, is that some of these slags can be effectively treated by milling and flotation to achieve a substantial improvement in the overall process. In fact, the new system has permitted a release from the process of 200,000 ounces of silver and 3,000 ounces of gold. In addition, it is estimated that 2% of the silver and 1.5% of the gold in the doré slag constitute handling and slag losses at the smelter. These losses have been reduced from 32,500 ounces of silver and 260 ounces of gold a year to 2,600 ounces of silver and 6 ounces of gold as a direct result of the present invention, thus providing considerable additional savings.

It should, of course, be understood that the invention is not limited to the specific embodiment or example described above, but that various modifications obvious to the man familiar with this art can be made without departing from the spirit of this invention and the scope of the following claims. Thus, for example, the term "doré slag", as used herein, is not strictly limited to silica and/or lead slags from the dore furnace, but includes any silica and/or lead slag containing precious metals therein, whether such slag originates from a dore furnace, a cupellation furnace or an induction furnace as, for example, disclosed in U.S. Pat. No. 4,029,494 of June 14, 1977. Also, although no special pre-treatment of the slag is contemplated according to this invention such as special slow-cooling of the slag, it is obvious that, depending on the composition of the slag, some such pre-treatment may be useful to improve even further the overall recoveries of the precious metals; however, any such pre-treatment will not be the most critical feature of the overall doré slag milling process, as is the case with converter slags, and it has been found that water quenching of the doré slag is the least desirable pretreatment.

I claim:

1. A method of treating doré slag which comprises the steps of grinding the slag, mixing the obtained pulp with water to form a slurry, adding a suitable collector to the slurry for selective flotation of precious metals, adding a suitable frother, aerating the slurry to produce a precious metals concentrate in the form of a froth on top of the slurry, and separating said concentrate from the remainder of the slurry.

2. Method according to claim 1, further comprising regrinding the tails from said selective flotation and subjecting them to a rougher flotation stage and at least one cleaner flotation stage to improve recovery of the precious metals.

3. Method according to claim 1, in which the grinding is effected by semi-autogenous grinding.

4. Method according to claim 1, in which the grinding proceeds until about 80% of the pulp passes a 100 mesh screen.

5. Method according to claim 1, in which the collector is sodium di-isobutyl dithiophosphate.

6. Method according to claim 1, in which the frother is methyl iso-butyl carbinol.

7. Method according to claim 1, in which the resulting concentrate is returned to the doré furnace with a new charge.

8. Method according to claim 2, in which the regrinding of the tails proceeds until about 95% of the resulting pulp passes a 325 mesh screen.

9. Method according to claim 2, in which two cleaner flotations are performed.

10. Method according to claim 2, which is carried out as a closed loop operation so that only the tailings from the rougher flotation are removed therefrom.

11. Method according to claim 1 wherein said doré slag is obtained from the doré furnace by skimming off the slag formed therein into pots and allowing said pots to air cool.

* * * * *

UNITED STATES PATENT AND TRADEMARK OFFICE
CERTIFICATE OF CORRECTION

PATENT NO. : 4,404,022
DATED : Sep. 13, 1983
INVENTOR(S) : Peter W. GODBEHERE

It is certified that error appears in the above–identified patent and that said Letters Patent are hereby corrected as shown below:

On the title page, insert

-- [30] Foreign Application Priority Data

November 10, 1981   Canada ........389,824

Signed and Sealed this

Twentieth Day of March 1984

[SEAL]

Attest:

GERALD J. MOSSINGHOFF

Attesting Officer     Commissioner of Patents and Trademarks